Patented May 1, 1951

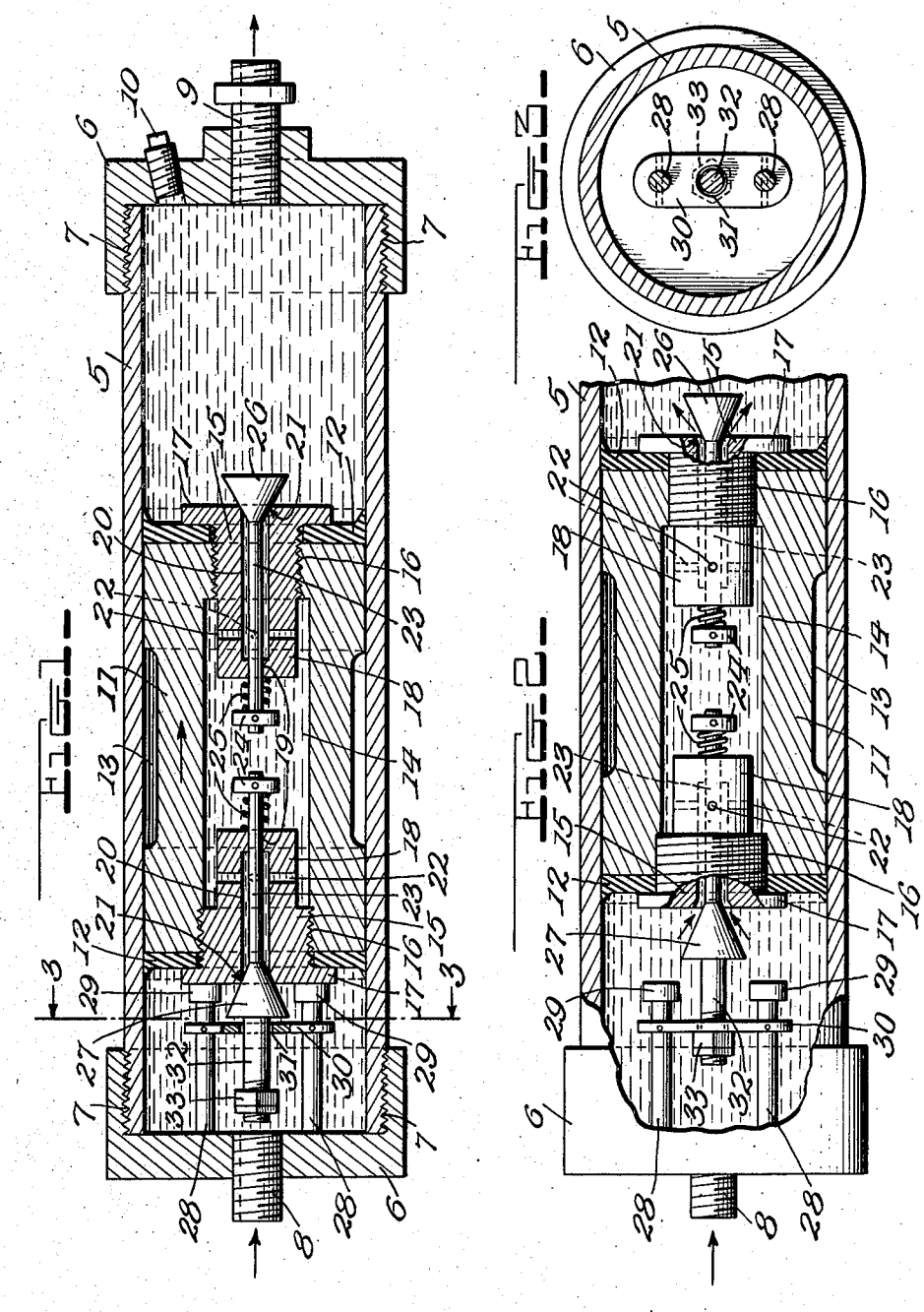

2,551,081

UNITED STATES PATENT OFFICE 2,551,081

AUTOMATIC HYDRAULIC BRAKE ADJUSTER

Reuben R. Alvarez, El Paso, Tex., assignor of one-third to Cruz R. Alvarez, Mesilla, N. Mex.

Application February 24, 1950, Serial No. 146,073

7 Claims. (Cl. 60—54.5)

The invention relates generally to the operation and control of devices by application of fluid pressure, and it primarily seeks to provide novel means for maintaining a predetermined definite working column of pressure fluid always ready to apply the desired force regardless of wearing of parts to which the force is applied or variations in the volume of said working column due to expansion or contraction of the pressure fluid.

A preferred example of use of the invention is in the hydraulic brake systems of automobiles, trucks or the like, and when connected in such systems in the line leading from the master cylinder to the branch lines for the individual wheels the improved control device will serve automatically to compensate for any demand for additional liquid in the lines as a result of wearing of the brake shoes or the contraction of the liquid column volume due to cold. The control device will similarly operate to effectively keep and protect the necessary space between the brake shoes and the wheel drums against additional pressure caused by natural expansion of the liquid column due to hot weather. In other words, the invention resides in providing a control device of the character stated which is effective to adjust automatically the normal spacing of the brake shoes from the brake drums so as to maintain the brakes in proper adjustment regardless of wearing of the shoes or tendencies of the liquid column to vary in volume as a result of changes in temperature and resultant expansion and contraction of the liquid column.

An object of the invention is to provide a device of the character stated including a cylinder closed at its ends except for a pressure fluid inlet at one end and a pressure fluid outlet at the other end, the inlet to be connected with the lines leading to the individual wheel braking devices, a free piston reciprocable in the cylinder and having a pressure fluid chamber therein, valve means in the end of the piston toward the outlet operable only toward the outlet responsive to pressure of fluid within the chamber and for permitting passage of pressure fluid from said chamber toward the outlet, valve means in the other end of the piston and operable only toward the inlet to admit pressure fluid into the piston chamber, the piston being movable toward the outlet by pressure of fluid entering the inlet and for forcing pressure fluid out of the cylinder through the outlet, and means operable each time the piston is moved a predetermined definite distance toward the outlet to open the last mentioned valve means and permit pressure fluid from the inlet end of the cylinder to pass through the open valve means into the piston chamber and force pressure fluid from said chamber out through the other valve means as an addition to the column of pressure fluid in advance of the piston toward the outlet.

Another object of the invention is to provide a control device of the character stated wherein there is included in the outlet end of the cylinder a displaceable closure through which pressure fluid may be removed so as to relieve pressure of brake fluid in the wheel cylinders and permit the brake shoe springs to pull the brake shoes far enough away from the drums to permit free removal of the wheels.

Another object of the invention is to provide a control device of the character stated wherein each valve means includes a spring seated valve element and the valve opening means comprises an abutment member fixed in the inlet end of the cylinder and a cooperating abutment member projecting from the adjacent spring seated valve element and movable with the piston so as to be engageable with the first mentioned abutment member after the piston has travelled a predetermined definite distance toward the outlet normally sufficient to effect a full brake application in a manner for withdrawing the connected valve element from its seat.

Another object of the invention is to provide a control device of the character stated wherein each valve means comprises a seat plug threaded into an end of the piston and having a longitudinal bore therein in open communication with the chamber within the piston, a valve stem extending through the bore and having an abutment head within said chamber and a coniform valve head flared endwise beyond the respective end of the piston, and spring means interposed between the respective abutment and the adjacent piston end to yieldably hold said valve head in seating contact over the bore end at the respective plug end, and in which the valve opening means comprises an abutment member fixed in the inlet end of the cylinder and a cooperating abutment member projecting from the adjacent spring seated valve head and movable with the piston so as to be engageable with the first mentioned abutment member after the piston has travelled a predetermined definite distance toward the outlet for the purpose of withdrawing the connected valve head from its seat.

With the above and other objects in view that will hereinafter appear, the nature of the invention will be more clearly understood by reference to the following detailed description, the appended claims and the several views illustrated in the accompanying drawing.

In the drawing:

Figure 1 is a central longitudinal sectional view illustrating the control cylinder structure embodying the invention, the parts being illustrated in the normally operating brake applying condition.

Figure 2 is a fragmentary view similar to Figure 1, the parts being illustrated in condition for supplying pressure fluid axially through the free piston to replenish a deficient pressure fluid column in advance of the piston.

Figure 3 is a vertical cross section taken on the line 3—3 on Figure 1.

In the example of embodiment of the invention herein disclosed, the improved control device takes the form of a hollow cylinder 5 having end closure members 6 threadably mounted thereon as at 7. The closure caps 6 close the ends of the cylinder except for a pressure fluid inlet 8 as shown at the left in Figure 1, and a pressure fluid outlet 9 as shown at the right in said figure. A closure plug 10 is threadedly mounted in the closure cap at the outlet end of the cylinder, and may be removed for the purpose of gaining access to the interior of the cylinder at said end for a purpose to be explained hereinafter.

A free piston 11 is reciprocably mounted in the cylinder and has a sealing washer 12 attached to each end thereof. It is preferred that an annular clearance 13 be provided intermediately of the ends of the piston, this clearance serving to collect any foreign matter which may work its way in between the piston and the inner wall of the cylinder which is slidably contacted thereby.

An axial bore is provided in the piston and forms a pressure fluid chamber 14. Each end of the piston is equipped with a valve means, and each valve means includes a seat plug 15 which is threadably mounted at 16 in the respective end of the piston. Each plug 15 has an enlarged end cap extension 17 which may be utilized to secure the adjacent sealing washer 12 in position, and at its inner end each said plug includes a reduced diameter end extension 18 which results in the provision of an annular space surrounding the inner end extremity of the plug within the piston chamber 14. Each plug 15 also is equipped with an axial stem slide bore 19 at its inner end, and a counterbore 20 extending through its outer end and providing a valve seat at 21. Radial bores 22 afford communication between the interior of the plug counterbore 20 and the annular space surrounding the reduced diameter plug end extension 18 within the chamber 14.

A valve stem 23 is slidable in each plug bore 19 and is equipped with an inner abutment head 24, a compression spring being interposed between each abutment head 24 and the adjacent plug end and constantly tending to move the valve stem inwardly. The stem 23 toward the outlet end of the cylinder carries a coniform valve element 26 which flares outwardly toward the outlet 9 and is yieldably held against the seat 21 in the manner clearly illustrated in Figure 1. The other stem 23 carries a coniform valve element 27 which flares outwardly toward the inlet 8, and this valve element also is yieldably held against its seat 21 by the associated compression spring 25.

Stop pins 28 are fixed to and projected inwardly in parallel spaced relation from the closure cap 6 at the inlet end of the cylinder, and said pins are equipped with abutment or stop heads 29. An abutment plate 30 also is secured to the pins 28 and extends transversely thereacross outwardly of the stops 29 in the manner clearly illustrated in Figures 1 and 2. The abutment plate is centrally apertured as at 31 to permit passage therethrough of a valve opening extension 32 which projects axially toward the inlet 8 from the adjacent valve element 27.

Assuming the control devices to be incorporated in the hydraulic braking system of an automobile or truck, the inlet 8 will be connected with the line leading from the master cylinder of said system, and the outlet 9 will be connected with the master line leading to the several branches which connect with the individual wheel braking sets. It is to be understood that by stepping on the foot pedal of the braking system the brake fluid from the master cylinder will be caused to enter the control cylinder 5 through the inlet 8, filling the chamber therein behind, or to the left side of the piston 11 as viewed in Figure 1. Pressure of the incoming fluid will move the piston 11 to the right, and after it has moved a predetermined definite distance determined by the positioning of the abutment plate 30, the valve element carried abutment 33 will strike the abutment plate. Continued movement of the piston 11 will now cause the valve element 27 to be unseated in the manner clearly illustrated in Figure 2. Pressure fluid entering through the counterbore 20 and radial bores 22 will fill the piston chamber 14 and then enter the counterbore 20 of the other valve means through its radial bores 22 and bring about an unseating of the valve element 26 in the manner illustrated in Figure 2. It will be apparent by reference to Figure 2 that pressure fluid can now be forced through the piston into the outlet end of the cylinder in advance of the piston 11 by proper manipulation of the brake pedal, and this manipulation of the brake pedal is continued a suitable number of times to provide a full column of pressure fluid in the braking system and effect a full application of the brake shoes against the wheel drums.

A filling of the cylinder and the braking system and the full application of the brake shoes having been effected in the manner stated, the pressure of the brake pedal is released and the springs associated with the brake shoes will retract the shoes and force brake fluid back into the outlet end of the cylinder shown at the right in Figure 1. This spring seals the brake fluid in the outlet end of the cylinder 5, the valve element 26 being automatically seated by the associated compression spring 25. The valve element 27 will be seated in like manner and the pressure fluid will act against the piston 11 to move the same to the left as viewed in Figure 1, ultimately bringing the plug enlargement 17 against the stops 29 as shown in Figure 1. In moving to the left in the manner described, the piston 11 displaces some pressure fluid through the inlet 8 and returns the same to the master cylinder, and it will be apparent that said movement of the piston enlarges the space between the advance end of the piston and the adjacent outlet end closure 6 permitting return of pressure fluid into the cylinder 5 through the outlet 9 and allowing the brake shoes to be withdrawn from contact with the wheel drums in a manner for providing the proper "brake release" spacing between said shoes and said drums.

Thereafter, whenever the foot brake pedal is actuated, brake fluid will be forced through the inlet 8 into the cylinder chamber behind the piston 11 in a manner for forcing the piston forwardly and causing the advance end thereof to displace pressure fluid through the outlet and bring about the desired application of the brakes. It will be understood that during this normal operation of the brakes the valve elements 27 and 26 will remain seated since the piston 11 will never move far enough to the right to cause the abutment 33 to engage the abutment plate 30 and effect an unseating of the valve element 27. In other words, the piston 11 moves back and forth during normal application of brakes without any unseating of the valve elements 27 and 26 so long as the spacing between the brake shoes and the wheel drums remains satisfactory. When more than the proper amount of spacing between the brake shoes and the brake drums is created by wearing of the brake shoe linings, automatic adjustment is brought about when by applying the pressure to the foot pedal and forcing pressure fluid into the cylinder behind the piston, or to the left thereof as viewed in Figure 1, movement of the piston far enough to the right to cause an unseating of the valve element 27 is brought about in the manner clearly illustrated in Figure 2. The unseating of the valve element 27 will allow pressure fluid passage through both valve elements 27 and 26 in the manner clearly illustrated in Figure 2 so as to add to the effective column of pressure fluid in advance of the piston and automatically accomplish the desired re-adjustment of the brakes.

By removal of the screw plug 10 at the discharge end of the cylinder it is possible to withdraw pressure fluid and relieve the pressure of the brake fluid in the wheel cylinders so that the brake shoes will be retracted far enough to allow the desired removal of the wheels.

It is well known that the brake shoes at the front wheels of a vehicle should have more clearance than the brake shoes at the rear wheels in order to allow the rear brakes to grip slightly in advance of the front brakes, and in order to provide this desired condition in a braking system embodying the herein disclosed invention the springs associated with the front brake shoes should be of a tension stronger than those associated with the brake shoes at the rear wheels.

While the herein mentioned incorporation of the improved control cylinder as a part of a vertical braking system is an outstanding and preferred adaptation of the invention, it is to be understood that the control cylinder may be employed in other combinations wherein it is desired to maintain a predetermined definite working development of pressure fluid always ready to apply the desired force regardless of wearing of parts to which the force is applied or variations in the volume of said working column due to expansion or contraction of the pressure fluid.

While one form of the invention has been shown for purposes of illustration, it is to be clearly understood that various changes in the details of construction and arrangement of parts may be made without departing from the spirit and scope of the invention as defined in the appended claims.

I claim:

1. In a device of the character described, a cylinder closed at its ends except for a pressure fluid inlet at one end and a pressure fluid outlet at the other end, a free piston reciprocable in the cylinder and having a pressure fluid chamber therein, valve means in the end of the piston toward said outlet openable only toward said outlet responsive to pressure of fluid within said chamber and for permitting passage of pressure fluid from said chamber toward said outlet, valve means in the other end of the piston and openable only toward said inlet to admit pressure fluid into the piston chamber, said piston being movable toward said outlet by pressure of fluid entering the inlet and for forcing pressure fluid out of the cylinder through the outlet, and means operable each time the piston is moved a predetermined definite distance toward the outlet to open said last mentioned valve means and permit pressure fluid from the inlet end of the cylinder to pass through the open valve means into the piston chamber and force pressure fluid from said chamber out through the other valve means into the outlet end of the cylinder and through said outlet.

2. A device as defined in claim 1 in which there is included a displaceable closure in the outlet end of the cylinder through which pressure fluid may be removed from the outlet end of the cylinder.

3. A device as defined in claim 1 in which the piston is provided intermediately of its ends with an annular clearance opposed to the interior wall of the cylinder and effective to collect foreign matter which might find its way between the opposing piston and cylinder walls.

4. A device as defined in claim 1 in which each valve means includes a spring seated valve element and the valve opening means comprises an abutment member fixed in the inlet end of the cylinder and a cooperating abutment member projecting from the adjacent spring seated valve element and movable with the piston so as to be engageable with the first mentioned abutment member after the piston has travelled a predetermined definite distance toward the outlet for the purpose of withdrawing the connected valve element from its seat.

5. A device as defined in claim 1 in which there is included stop means for limiting movement of the piston toward the inlet so as to provide a pressure fluid impounding chamber of predetermined definite size at the outlet end of the cylinder when the piston is against said stop means.

6. A device as defined in claim 1 in which each valve means comprises a seat plug threaded into an end of the piston and having a longitudinal bore therein in open communication with the chamber within the piston, a valve stem extending through the bore and having an abutment head within said chamber and a coniform valve head flared endwise beyond the respective end of the piston, and spring means interposed between the respective abutment and the adjacent piston end to yieldably hold said valve head in seating contact over the bore end at the respective plug end.

7. A device as defined in claim 1 in which each valve means comprises a seat plug threaded into an end of the piston and having a longitudinal bore therein in open communication with the chamber within the piston, a valve stem extending through the bore and having an abutment head within said chamber and a coniform valve head flared endwise beyond the respective end of the piston, and spring means interposed between the respective abutment and the adjacent piston end to yieldably hold said valve head in seating contact over the bore end at the respective plug end, and in which the valve opening means comprises an abutment member fixed in the inlet end of the cylinder and a cooperating abutment member projecting from the adjacent spring seated valve head and movable with the piston so as to be engageable with the first mentioned abutment member after the piston has travelled a predetermined definite distance toward the outlet for the purpose of withdrawing the connected valve head from its seat.

REUBEN A. ALVAREZ.

REFERENCES CITED

The following references are of record in the file of this patent:

UNITED STATES PATENTS

| Number | Name | Date |
|---|---|---|
| 697,140 | Goldschmidt | Apr. 8, 1902 |
| 2,239,348 | Wirtanen | Apr. 22, 1941 |
| 2,523,172 | Wilson | Sept. 19, 1950 |

FOREIGN PATENTS

| Number | Country | Date |
|---|---|---|
| 504,278 | Great Britain | Apr. 19, 1939 |